UNITED STATES PATENT OFFICE.

HUGH C. SICARD, OF BUFFALO, NEW YORK, ASSIGNOR TO UNITED STATES FERRO-ALLOYS CORPORATION, OF NEW YORK, N. Y., A CORPORATION OF NEW YORK.

ALLOY OF IRON, ZIRCONIUM, AND TITANIUM AND PROCESS FOR THE PRODUCTION THEREOF.

1,335,991.  Specification of Letters Patent.  Patented Apr. 6, 1920.

No Drawing.  Application filed August 18, 1919.  Serial No. 318,327.

*To all whom it may concern:*

Be it known that I, HUGH C. SICARD, a citizen of the United States of America, residing in the city of Buffalo, county of Erie, and State of New York, have invented a new and useful Alloy of Iron, Zirconium, and Titanium and Process for the Production Thereof, of which the following is a full, clear, and exact description.

In the manufacture of zirconium steel, *i. e.*, a steel containing various amounts of zirconium; great difficulty is experienced in obtaining the desired quality of product owing to the oxidation of some of the added zirconium by oxids contained in the steel.

I have found that if an alloy of iron, zirconium and titanium is used for making the zirconium steel, the titanium, being more readily oxidized than the zirconium, can be used to eliminate the oxids in the steel and thus protect the zirconium from oxidation when added to the steel.

In making the alloy, I use as a source of zirconium the ore baddeleyite which contains from 80% to 95% $ZrO_2$. As a source of titanium, I use the ore rutile containing 95% or more $TiO_2$ and scrap iron to supply the iron content. These materials are mixed with not only sufficient carbon, to reduce the $ZrO_2$ and the $TiO_2$ but an excess thereof which, combining with zirconium, titanium and iron forms a complex carbid in the finished alloy.

In general I do not add any slag forming materials to the mixture as there are usually sufficient impurities present in the ores to form a slag. In case, however, there is an excess of silica in the ore I may add lime or other fluxing material to give a suitable slag. The mixture is smelted in an open electric furnace, for example the Siemens type. In making the alloy for the purpose described I use sufficient baddeleyite ore to yield 15% to 50% zirconium in the finished product; the rutile, on the other hand, is added in sufficient quantity to give 1% to 18% titanium in the alloy and finally the carbon should be in such excess over that required for reduction that the alloy will contain 1% to 8% carbon.

The alloys that I have found the most desirable are of the following compositions:

Zirconium _____ from 35% to 40%
Titanium _____ from 4% to 5%
Carbon _____ from 4% to 8%
Iron _____ from 57% to 47%

Obviously by using the process herein described, alloys composed of the foregoing elements may be formed with different percentages present than those above set forth and still protect the zirconium from being oxidized. It should, however, be recognized that some impurities, such as silicon and aluminum, are usually unavoidably present in small quantities in the finished product.

Having thus described my invention, what I claim is:

1. A method for the production of alloys of iron, zirconium and titanium comprising the mixture of baddeleyite ore, rutile ore, scrap iron and carbon in sufficient quantity not only to reduce the zirconium and titanium oxids present in the ores but enough to combine with the zirconium, titanium and iron to form a complex carbid in the finished alloy and then smelting this mixture in an electric furnace.

2. A method for the production of alloys of iron, zirconium and titanium comprising the mixture of zirconium oxid, titanium oxid, scrap iron and carbon in sufficient quantity not only to reduce the zirconium and titanium oxids present in the ores but enough to combine with the zirconium, titanium and iron to form a complex carbid in the finished alloy and then smelting this mixture in an electric furnace.

3. A method for the production of alloys of iron zirconium and titanium comprising the mixture of a sufficient quantity of baddeleyite ore to yield from 15% to 50% zirconium in the finished product, a sufficient quantity of rutile ore to yield from 1% to 18% titanium in the finished product and carbon in such an excess quantity over that required for the reduction of the oxids that the finished product will contain from 1% to 8% carbon and a sufficient quantity of scrap iron so that the balance of percentage in the finished product will have an iron content and then smelting this mixture in an electric furnace.

4. A method for the production of alloys of iron, zirconium and titanium comprising the mixture of baddeleyite ore, rutile ore, scrap iron and carbon in sufficient quantity not only to reduce the zirconium and titanium oxids present in the ores but enough to combine with the zirconium, titanium and iron to form a complex carbid in the finished alloy, then fluxing the mixture in an electric furnace.

5. As a new article of manufacture, an alloy of zirconium, titanium and iron composed of from 35% to 40% of zirconium from 4% to 8% of carbon and from 57% to 47% of iron.

In testimony whereof I have hereunto signed my name.

HUGH C. SICARD.